3,008,473
TOBACCO SMOKE FILTERS WITH STARCH DERIVATIVE ADDITIVE
George P. Touey, Kingsport, Tenn., assignor to Eastman Kodak Company, Rochester, N.Y., a corporation of New Jersey
No Drawing. Filed Nov. 13, 1958, Ser. No. 773,554
8 Claims. (Cl. 131—208)

This invention relates to a tobacco smoke filter containing an additive and the method for the manufacture thereof. More particularly, this invention concerns a cellulose acetate filament filter which contains an ungelatinized starch derivative as an additive.

In my companion application Serial No. 413,950 filed March 3, 1954, now U.S. Patent No. 2,881,769 of which the present application is a continuation-in-part, I have described improved tobacco smoke filters. These improved filters are comprised of longitudinally oriented continuous filaments, which filaments carry on their surface certain additives. Such filters as described in my earlier application are thought to represent an improvement over various prior art filters and their method of manufacture in several respects. That is, my filters remove more nicotine and tar from tobacco smoke than certain other types of filters and are relatively simple and inexpensive to manufacture as compared with many types of filters.

After further investigation I have now found how to further improve my filament filters containing an additive. I have found that by employing a certain type of additive material which will be described in detail hereinafter, that not only is the production of such filter facilitated but an improved filter is obtained in that the additive is more uniformly distributed and other advantages are secured.

One object of this invention is to provide a new type of powdered additive for the cellulose acetate tow type of filter. Another object is to provide a type of powder additive which remains free flowing and free of agglomerates when it is dusted on a cellulose acetate tow filter material. Still another object is to provide a type of additive which does not form pastes or thixotropic slurries when it is suspended in organic liquids even though the suspensions contain as high as 50% of the powdered additive. Still another object is to provide an improved filament filter wherein the filaments carry said additive. Another object is an improved method utilizing said additives. Other objects will appear hereinafter.

I have found by using an ungelatinized starch derivative as herein described, as the powder to be added to the cellulose acetate tow that an improved filament filter may be obtained. This ungelatinized starch derivative is a di- or poly-valent metal salt of a starch acid ester with the following formula:

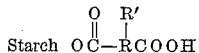

The R is a radical from the group of dimethylene and trimethylene radicals and the R' is a hydrocarbon substituent from the class consisting of an alkyl, alkenyl, aralkyl, and aralkenyl groups.

These ungelatinized starch derivatives which are commercially available materials are free flowing powders. They are also readily dispersed in organic solvents giving free flowing nonthixotropic suspensions containing a high concentration of the derivative. The derivatives which I prefer to use are starch acid alkyl succinates which have been converted to their free flowing aluminum salts. The alkyl groups on the succinate ester group attached to the starch are long chain hydrocarbon radicals.

The free flowing characteristic of these powders makes them an excellent dusting material for deposition on a bloomed out tow comprised of several thousand continuous, crimped cellulose acetate fine filaments. In contrast to certain powders heretofore proposed, they show no tendency to agglomerate on the tow. Also they flow freely through the conventional types of dusting equipment.

Since these powders are easily dispersed in organic solvents and show no tendency to set to a gel in such dispersions they can also be uniformly sprayed on the bloomed out cellulose acetate crimped tow from slurries of the powders in plasticizers, plasticizers diluted with organic solvents, organic solvents and organic solvents and water.

The following examples illustrate the invention:

*Example 1–A*

*Filter with powder added by a dusting technique.*—A crimped (16 crimps per inch) tow of cellulose acetate filaments containing approximately 12,000 filaments of five denier per filament was slowly pulled over a banding device as disclosed in the Crawford and Stevens Patent 2,794,480. This device spread out the fibers to a width of 10 inches. While the filaments were in this spread out condition they were dusted on both sides with the aluminum salt of a rice starch dodecyl succinate. No difficulties such as agglomeration of the powder on the filaments or clogging of the dusting apparatus were encountered during this dusting operation. That is, an improved product was obtained because of more uniform and better distribution of additive.

After the filaments were dusted with the powder they were sprayed on both sides with glycerol triacetate, a plasticizer which imparts rigidity to the finished filter rod. The dusted and sprayed tow was then pulled back to its original shape of a bundle and fed into a filter rod make-up machine which wrapped it with paper and cut it into rods similar in size to a standard size cigarette. The rods contained 18% powder in accordance with the present invention, 12% plasticizer, and 70% cellulose acetate on the basis of their total weight without the paper wrapper. After a period of four hours at room temperature (76° F.) the rods were rigid due to the action of the glycerol triacetate on the cellulose acetate fibers. Microscopic examination of several of the opened filter rods revealed that the powder was uniformly dispersed on the filament surfaces.

The filter rods were cut into filter tips 15 mm. in length. Ten of these tips were attached to standard domestic cigarettes (brand A) which were shortened by 15 mm. to compensate for the length of the filter. These cigarettes were then smoked to 35 mm. butt lengths on a smoking machine similar in design and operation to the smoking machine described by J. A. Bradford et al., in Ind. and Eng. Chem. 28, pp. 836–9 (1936). The collected smoke was analyzed for nicotine and tars. The results of the test are listed in Table I in line designated as Example 1–A.

Example 1–B

*Filter without powdered additive.*—A crimped (16 crimps per inch) tow of cellulose acetate yarn containing approximately 20,000 filaments of five denier per filament was slowly pulled over the compressed air banding device (as above) which spread out the filaments to a width of 10 inches. While in this spread condition the filaments were sprayed on both sides with glycerol triacetate. The sprayed filaments were then pulled back to their original shape of a bundle and fed into the filter rod make-up machine which wrapped it with paper and cut it into rods similar in size and shape to a standard size cigarette. The rods contained 13% plasticizer and 87% cellulose acetate on the basis of their total weight without the paper wrapper. After the rods became rigid they were cut into 15 mm. filter tips and ten of these tips were attached to the standard cigarettes (brand A) which had been shortened by 15 mm. These cigarettes were then smoked to 35 mm. butt lengths by means of the smoking machine referred to in Example 1. The collected smoke was analyzed for nicotine and tar. The results of the test are listed in Table I.

As controls, ten unshortened cigarettes (brand A) were smoked on the automatic smoking machine to butt lengths of 35 mm. The results of the test are listed in Table I.

| Filter | Average Pressure Drop of Cigarettes,[1] inches | Mg. Tar From 10 Cigarettes | Mg. Nicotine From 10 Cigarettes | Reduction in Tar Due to Filter, percent | Percent Reduction in Nicotine Due to Filter |
|---|---|---|---|---|---|
| None (control) | 3.1 | 168 | 27.0 | | |
| Ex. 1–A | 4.0 | 110 | 18.0 | 34.5 | 33.3 |
| Ex. 1–B | 4.1 | 134 | 22.0 | 20.0 | 18.5 |

[1] Pressure drop expressed as inches of water at an air flow rate of 1050 ml./minute.

These results illustrate that the filter with the powdered additive of the present invention removed more tar than the filter without the additive even though the former filter contained less fibers. Thus, this improvement to the basic filter of Example 1–A cannot be obtained simply by adding more fibers to such a filter. The results also show that the addition of the powdered additive does not materially increase the pressure drop.

Example 2

*Filter with powder added by the slurry technique.*—A crimped (16 crimps per inch) tow of cellulose acetate filaments containing approximately 12,000 filaments of five denier per filament was slowly pulled over the compressed air banding device which spread it to a width of 10 inches. While in this spread out condition the tow was sprayed on both sides with a slurry consisting of 4 parts aluminum salt of rice starch dodecyl succinate suspended in a solution of 3 parts propylene glycol and 3 parts glycerol triacetate. Due to the highly dispersed condition of the powder in the liquid and the high fluidity of the liquid there was no trouble encountered in forcing this high solids suspension through the fine openings of the spray gun. Also, the spray could be ejected from the guns at a very constant rate which resulted in a uniform application of the spray to the opened filaments.

After this treatment the filaments were pulled back to the shape of a bundle and fed into the filter rod make-up machine which wrapped it with paper and cut it into rods similar in size and shape to a standard cigarette. The rods containing 16% of the starch alkyl succinate powder, 12% propylene glycol, 12% glycerol triacetate and 60% cellulose acetate on the basis of their total weight without the paper wrapper. After four hours storage at room temperature the rods were sufficiently rigid to be cut into 15 mm. filter tips. These were placed on ten of the standard cigarettes (brand A) which had been shortened by 15 mm. The ten filtered cigarettes were smoked to 35 mm. butt lengths by means of the smoking machine referred to in Example 1. The collected smoke was analyzed for nicotine and tar. A total of 113 mg. of tar and 18.5 mg. of nicotine were collected. These values, when compared with those in Table I, Example 1, indicate the filter removed 32.7% tar and 31.5% nicotine. The filtered cigarettes had an average pressure drop of 3.9 inches.

Example 3

*Filter with powder added by the slurry technique.*—The crimped continuous filaments were spread out to a width of 10 inches by means of a compressed air banding device. While in this spread out condition it was sprayed on both sides with glycerol triacetate plasticizer. It was then sprayed with a slurry consisting of 4 parts aluminum salt of rice starch dodecyl succinate suspended in a solution of 3 parts propylene glycol and 3 parts water. This slurry was easily sprayed on the tow because of its high fluidity.

After this treatment the tow was pulled back to its original shape of a cord and fed into the filter rod make-up machine which wrapped it with cigarette paper and cut it into rods similar in size and shape to a standard cigarette. The rods contained 11% glycerol triacetate, 19% starch derivative, 14.3% propylene glycol, 14% water and 52.7% cellulose acetate on the basis of their total weight without the paper wrapper.

After 12 hours storage at room temperature the rods were quite rigid and could be cut into 15 mm. filter tips. These were placed on 10 of the standard cigarettes (brand A) which had been shortened by 15 mm. The ten filtered cigarettes were smoked to 35 mm. butt lengths by means of the smoking machine referred to in Example 1. The collected smoke was analyzed for nicotine and tar. A total of 104 mg. of tar and 17 mg. of nicotine were collected. These values, when compared with those in Table I, Example 1, indicate the filter removed 38% tar and 37% nicotine. The filtered cigarettes had an average pressure drop of 4.1 inches.

If the slurry technique (Examples 2 and 3) is used a wide variety of organic solvents can be employed to suspend the starch derivatives. However, the organic solvent should not dissolve or swell the ungelatinized granules of the starch derivative. Also, the organic solvent should not be toxic or distasteful to the smoker. Thus, such solvents as ethyl alcohol, glycerine, and the various glycols and polyglycols may be employed as suspending liquids for the powdered additive of the present invention. It is also possible to use solvents that may be distasteful but which can be easily evaporated from the filter rod. Thus, for example, the low-molecular-weight ethers and ketones can be used. However, the preferred solvents are those which are known to be tasteless since this would avoid entirely the possibility of having traces of a distasteful solvent remaining in the finished filter tip.

In the above examples I have described applying the ungelatinized starch (referred to herein for convenience of reference as S D) as such to the crimped continuous filaments to obtain improved filters. However, improved results may be obtained by mixing the S D with the additives such as e. g. corn, wheat, potato, rice and tapioca starches, dextrin, and various forms of hydrolyzed starches, described in the aforementioned parent Patent No. 2,881,769.

In other words, it is not required to employ 100% S D of the instant invention to obtain certain improved results in minimizing pressure drop variations and the like.

The following data in tabular form will illustrate how various combinations such as 85% rice starch plus 15% of a metal salt of starch acid ester reduces filter rod pressure deviations.

| Rod type | Denier and size | Powder | Dry Wt. 20 rods | Parts per hundred powder | Rod press | Standard deviation | Dev.×100 Rod press |
|---|---|---|---|---|---|---|---|
| 1 AUT | 5-75,000 25.5×90 | Rice Starch | 17.27 | 35.4 | 9.6 | .746 | 7.77 |
| 1 AUU | 5-75,000 25.5×90 | 85% Rice S.+15% S D | 17.35 | 38.1 | 9.3 | .486 | 5.21 |
| 1 BSE | 5-60,000 24.8×90 | Rice Starch | 14.32 | 55.7 | 7.9 | .589 | 7.46 |
| 1 BSJ | 5-60,000 24.8×90 | 85% Rice S.+15% S D | 14.42 | 52.1 | 7.2 | .320 | 4.44 |

The following table shows other powder mixtures used.

| Rod Type | Tow | Dust |
|---|---|---|
| 1 APO | 5-70,000 | 50% S D+50% Corn Starch. |
| 1 APS | 5-70,000 | 80% S D+20% Corn Starch. |
| 1 AQG | 5-70,000 | 50% S D+50% Rice Starch. |
| 1 AQX | 5-70,000 | 10% S D+90% Rice Starch. |
| 1 AQY | 5-70,000 | 20% S D+80% Rice Starch. |
| 1 ART | 5-70,000 | 15% S D+85% Nonferal (Calcium Carbonate). |
| 1 ASB | 5-70,000 | 15% S D+85% Gamco Marble (Ground Marble). |
| 1 AST | 5-70,000 | 15% S D+85% Cellulose Acetate. |

While, as pointed out above, I prefer specifically a starch derivative exemplified by the aluminum salt of rice starch dodecyl succinate, other similar starch derivatives may be used provided they are nontoxic, are not distasteful or do not have an unacceptable odor. In general such starch derivatives may be represented by the following structural formulas:

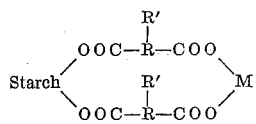

or

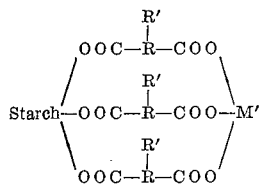

or

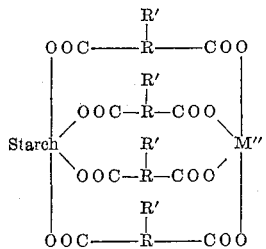

wherein R is the radical and R' the substituent above referred to, and where M, M' and M" are di-, tri-, and tetravalent metallic or alkaline earth metal ions, respectively.

In the above examples, I have described the use of 12,000 filaments of 5 denier per filament. That is, I have described the use of filaments of comparable denier and number in the several examples so that the improved function of the additive of the present invention may be better observed. However, other size filaments may be used provided they are not too coarse and are generally not greater than 16 denier per filament. In general, however, I prefer to use filaments of 5 denier per filament or smaller in making my filters. While 12,000 filaments as described are quite satisfactory, it is possible to use as small as 4,000 or as great as 40,000 filaments but in general, a range of the order of 10,000–20,000 filaments is preferred.

In all instances I prefer to use continuous crimped filaments preferably crimped to greater than 10 crimps per inch and comprised of cellulose acetate. The bundle of filaments would preferably be dechannelized by roll treatment, air blowing or other suitable procedure. Such cellulose acetate filaments are compatible with plasticizer and solvents as above described. However, other thermoplastic continuous crimped filaments of comparable denier and the like properties may be used provided they are free of taste and nontoxic. Although such filaments in certain instances are not regarded as satisfactory as the cellulose acetate filaments which I prefer.

Although I have described the use of glycerol triacetate as the plasticizer and prefer such plasticizer, other nontoxic high quality plasticizers such as di(methoxyethyl) phthalate, methyl phthalyl ethyl glycollate and triethyl citrate may be used. The percentage of plasticizer may vary between 5% and 18% without materially impairing the filtration action of the cellulose acetate filaments.

The amount of the metal salt in powder form may constitute between 10% and 35% of the weight of the filter (including the weight of any plasticizer and the weight of the filaments but not including the weight of the wrapper). The powdered metal salt of the starch acid ester would preferably be of a mesh size within the range of 200 to 400.

The invention has been described in detail with particular reference to preferred embodiments thereof, but it will be understood that variations and modifications can be effected within the spirit and scope of the invention as described hereinabove and as defined in the appended claims.

I claim:
1. As an improved article of manufacture a filament filter containing additives, such filter being essentially comprised of several thousand continuous crimped synthetic thermoplastic filaments of not greater than 16 denier per filament, the filaments carrying on their surface a salt derivative of a starch acid ester of the following formula:

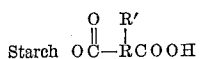

wherein R is a radical from the group of dimethylene and trimethylene radicals and the R' is a hydrocarbon substituent from the class consisting of an alkyl, alkenyl, aralkyl, and aralkenyl groups.

2. An article in accordance with claim 1 wherein the filaments are essentially comprised of cellulose acetate and the derivative is an aluminum salt of rice starch dodecyl succinate.

3. An article in accordance with claim 1 wherein the filter contains a content of plasticizer in addition to the additive.

4. A mixture of materials particularly adapted for addition to filters and added to said filters comprised of several thousand longitudinally oriented crimped continuous filaments, said mixture being comprised of a powdered additive adapted to minimize pressure drop variation of 100–300 mesh size and a finely divided starch derivative intermixed therewith.

5. A product in accordance with claim 4 wherein the starch derivative has a formula from the group consisting of the following formulas:

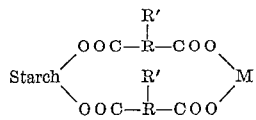

or

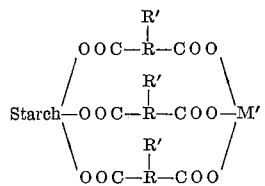

or

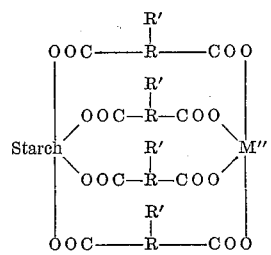

wherein R is the radical and R' the substituent above referred to, and where M, M' and M" are di-, tri-, and tetravalent metallic or alkaline earth metal ions, respectively.

6. As an article of manufacture a tobacco smoke filter comprised of several thousand crimped continuous synthetic filaments of a denier per filament of not greater than 16, the majority of which filaments extend substantially from end to end of said filter, a bonding agent contained by said filaments and a finely divided additive on the surface of said filaments, the filter being particularly characterized in that the additive is comprised at least to the extent of about 1/6 of a starch acid ester derivative.

7. An improved filter element which comprises a base made up of several thousand thermoplastic filaments, said filaments carrying a powdered additive having a starch derivative intermixed therewith, said additive being adapted to minimize the pressure drop variation, all of the aforesaid additive materials being dispersed over the surface of said filaments.

8. A filter element in accordance with claim 7 wherein the filaments have a plasticizer content.

References Cited in the file of this patent

UNITED STATES PATENTS

| | | |
|---|---|---|
| 2,707,308 | Taylor et al. | May 3, 1955 |
| 2,754,829 | Hess | July 17, 1956 |
| 2,805,671 | Hackney et al. | Sept. 10, 1957 |
| 2,813,051 | MacHenry | Nov. 12, 1957 |
| 2,881,769 | Touey | Apr. 14, 1959 |
| 2,881,770 | Touey | Apr. 14, 1959 |

FOREIGN PATENTS

| | | |
|---|---|---|
| 2,546 | Great Britain | 1876 |
| 440,316 | Great Britain | Dec. 24, 1935 |

OTHER REFERENCES

Condensed Chemical Dictionary, page 214. Published 1950 by Reinhold Publishing Corp., New York, N.Y.